US012807461B2

(12) United States Patent
Jeong et al.

(10) Patent No.: US 12,807,461 B2
(45) Date of Patent: Nov. 24, 2026

(54) AUTOMATION DEVICE FOR TRANSPORTING AND INPUTTING CONTAINER BAG

(71) Applicant: LG Energy Solution, Ltd., Seoul (KR)

(72) Inventors: Byeong Oh Jeong, Daejeon (KR); Seung Jae Won, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 230 days.

(21) Appl. No.: 18/730,585

(22) PCT Filed: Jul. 10, 2023

(86) PCT No.: PCT/KR2023/009723
§ 371 (c)(1),
(2) Date: Jul. 19, 2024

(87) PCT Pub. No.: WO2024/025205
PCT Pub. Date: Feb. 1, 2024

(65) Prior Publication Data
US 2025/0100853 A1 Mar. 27, 2025

(30) Foreign Application Priority Data
Jul. 29, 2022 (KR) ........................ 10-2022-0094619

(51) Int. Cl.
*B66C 17/06* (2006.01)
*B65B 69/00* (2006.01)
(Continued)

(52) U.S. Cl.
CPC .......... *B66C 17/06* (2013.01); *B65B 69/0008* (2013.01); *B66C 1/34* (2013.01);
(Continued)

(58) Field of Classification Search
CPC ........... B65D 88/66; B66C 17/06; B66C 1/40; B65B 69/0008
See application file for complete search history.

(56) References Cited

U.S. PATENT DOCUMENTS 4,037,469 A * 7/1977 Nordstrom ............. G01G 19/14
177/244
5,788,449 A * 8/1998 Riemersma ......... B65B 69/0091
414/415
(Continued)

FOREIGN PATENT DOCUMENTS

CN 215905466 U 2/2022
EP 2128052 B1 10/2012
(Continued)

OTHER PUBLICATIONS

International Search Report for Application No. PCT/KR2023/009723 mailed Oct. 23, 2023. 3 pgs.
(Continued)

*Primary Examiner* — Jonathan Snelting
(74) *Attorney, Agent, or Firm* — Lerner David LLP

(57) ABSTRACT

An automation device for packaging bag transport and input, includes: a rail disposed above a certain height in a horizontal direction; a hanger mounted on the rail to be capable of reciprocating in the horizontal direction, and enabling to reciprocate a packaging bag mounted at the lower end thereof in a vertical direction; a hopper disposed at the bottom of the rail and into which raw materials inside the packaging bag moved by the hanger are introduced; a hit post disposed near an inlet of the hopper and resolving an agglomeration phenomenon of the raw materials as the packaging bag is hit by the vertical direction reciprocation of the hanger; and grippers blocking the discharge of the raw materials by gripping the bottom of the packaging bag in
(Continued)

which the input of the raw materials to the hopper is completed.

9 Claims, 9 Drawing Sheets

(51) Int. Cl.

| | |
|---|---|
| ***B66C 1/34*** | (2006.01) |
| ***B66C 13/06*** | (2006.01) |
| ***B66C 13/16*** | (2006.01) |
| ***B66C 13/46*** | (2006.01) |

(52) U.S. Cl.
CPC ............ *B66C 13/063* (2013.01); *B66C 13/16* (2013.01); *B66C 13/46* (2013.01)

(56) References Cited

U.S. PATENT DOCUMENTS

| | | | | |
|---|---|---|---|---|
| 6,161,887 | A * | 12/2000 | Shiota | B66C 13/46 294/81.5 |
| 7,223,058 | B2 * | 5/2007 | Nyhof | B66C 19/00 414/415 |
| 9,387,950 | B2 * | 7/2016 | Hofman | B65B 69/0075 |
| 9,714,122 | B2 * | 7/2017 | Snape | B65D 88/1681 |
| 10,745,165 | B2 * | 8/2020 | Nakai | B65B 69/0083 |
| 11,230,401 | B2 * | 1/2022 | Hofman | B01F 31/55 |
| 11,396,433 | B1 * | 7/2022 | Euculano | B65B 61/24 |
| 2003/0099530 | A1 | 5/2003 | Bonerb | |
| 2013/0167972 | A1 | 7/2013 | Peressoni | |
| 2021/0069757 | A1 * | 3/2021 | Procksch | G01M 7/025 |
| 2022/0315347 | A1 * | 10/2022 | Liu | B65B 69/0083 |

FOREIGN PATENT DOCUMENTS

| | | | |
|---|---|---|---|
| JP | H07-025478 | A | 1/1995 |
| JP | H07291226 | A | 11/1995 |
| JP | H11292044 | A | 10/1999 |
| JP | 2000-296818 | A | 10/2000 |
| JP | 2001253522 | A | 9/2001 |
| JP | 2004123248 | A | 4/2004 |
| JP | 2005104510 | A | 4/2005 |
| JP | 2015105135 | A | 6/2015 |
| JP | 2018-122925 | A | 8/2018 |
| KR | 101928249 | B1 | 2/2019 |

OTHER PUBLICATIONS

Extended European Search Report including Written Opinion for Application No. 23846864.9 dated May 28, 2025. 8 pages.

* cited by examiner

[Figure 1]
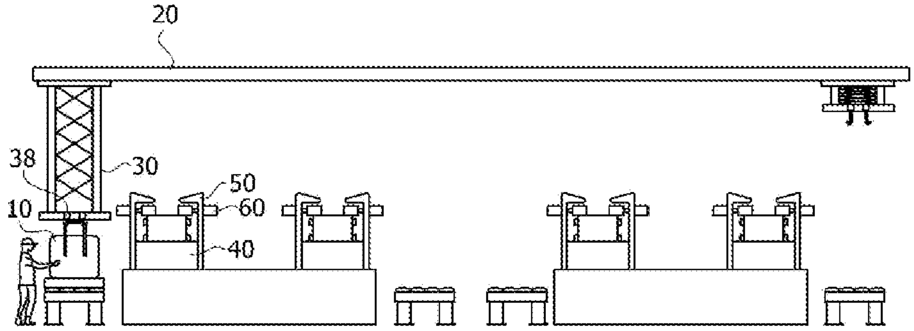
[Figure 2]
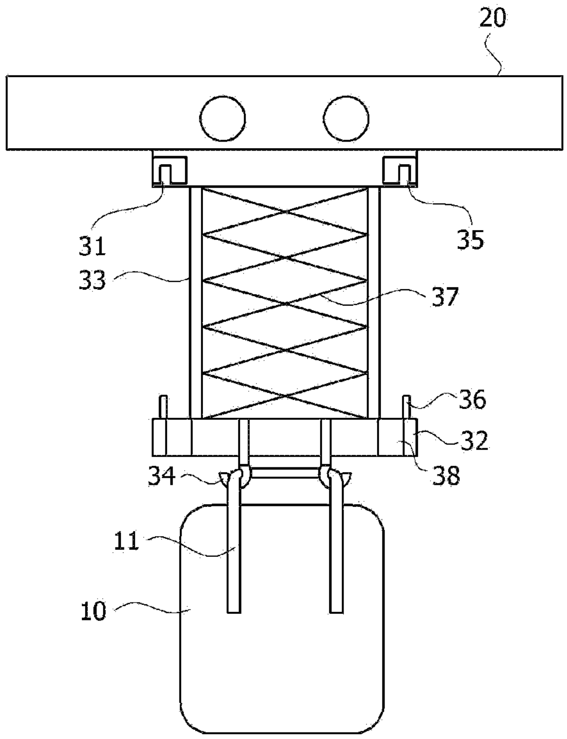

[Figure 3]
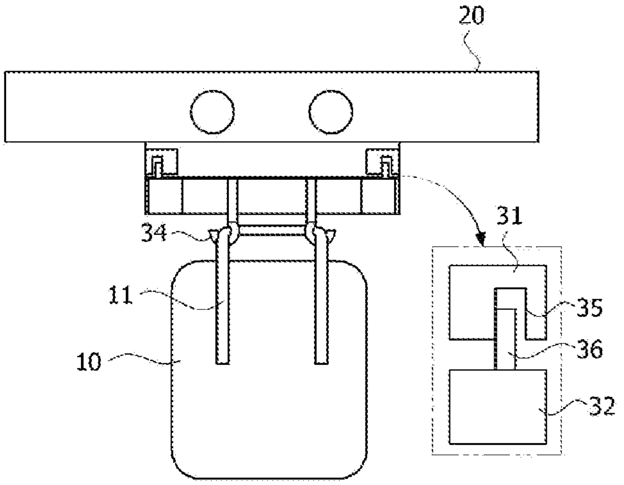
[Figure 4]
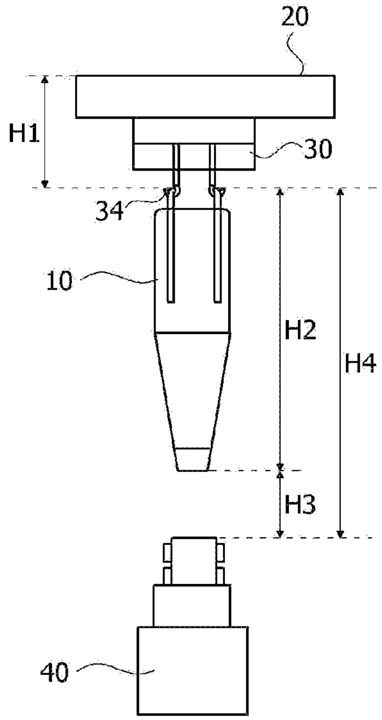

[Figure 5]
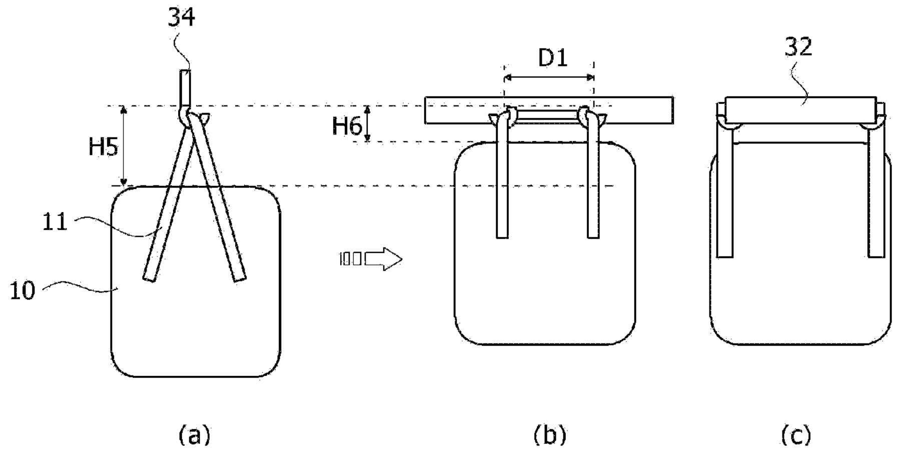
[Figure 6]
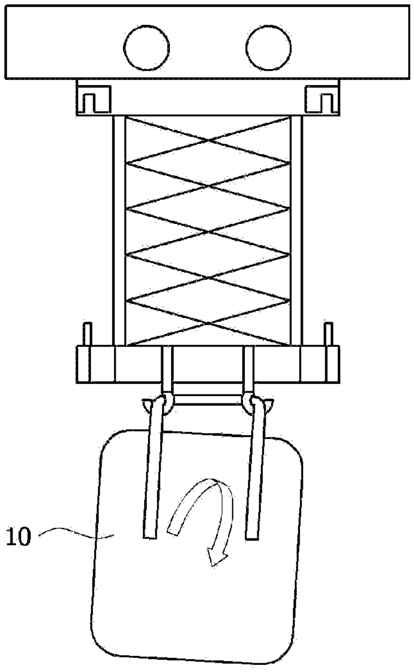

[Figure 7]
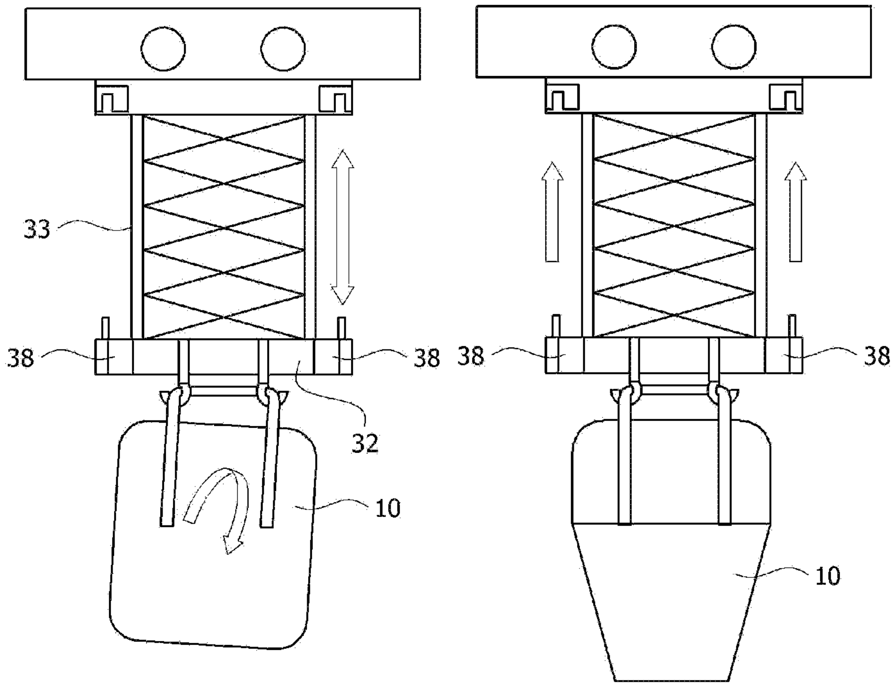
[Figure 8]
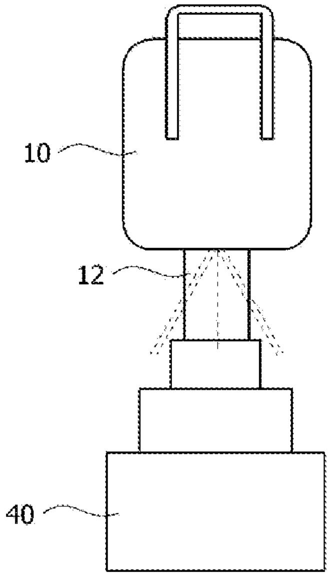

[Figure 9]
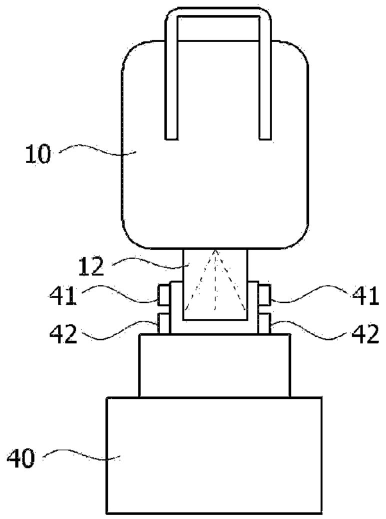
[Figure 10]
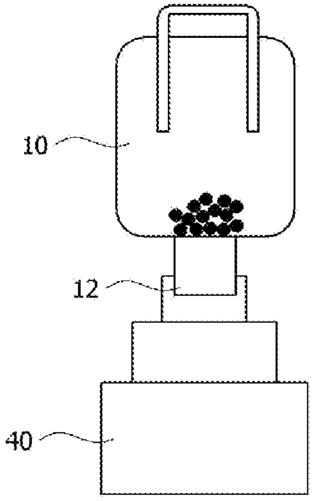

[Figure 11]
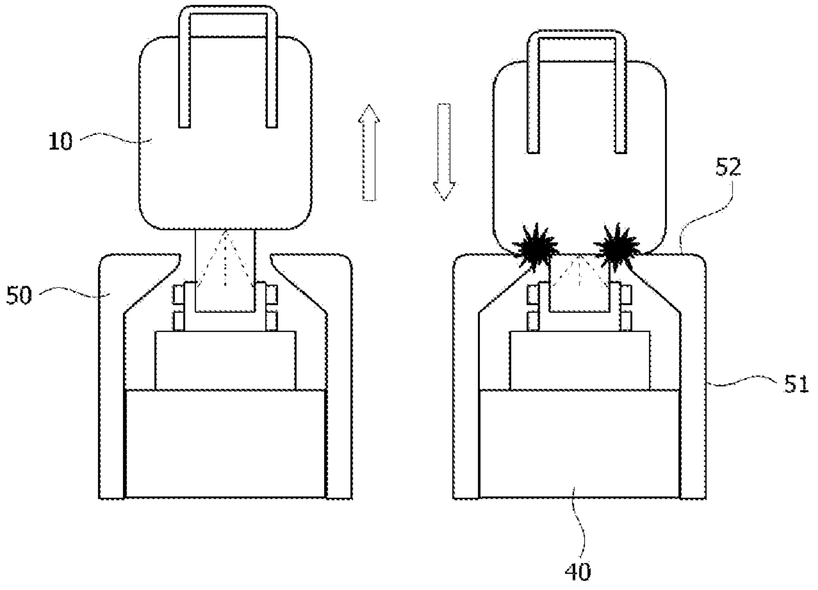
[Figure 12]
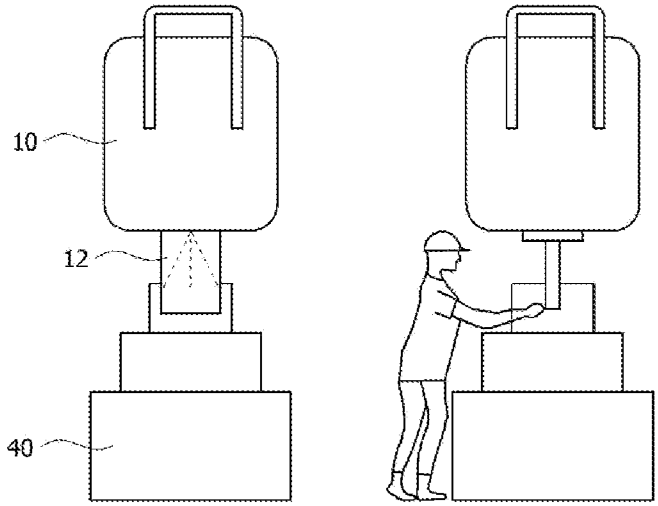

[Figure 13]
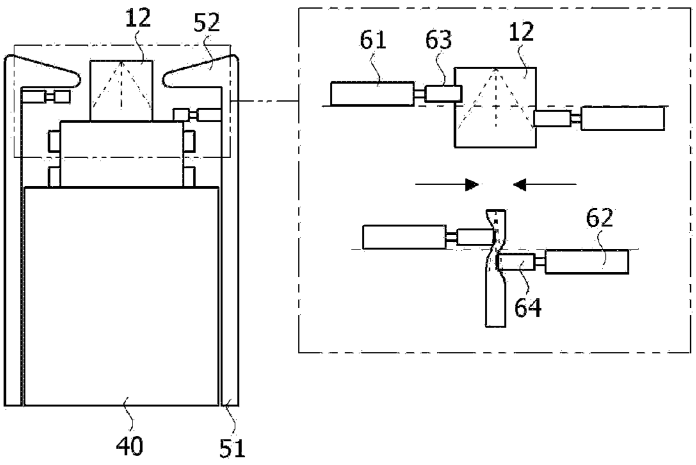
[Figure 14]
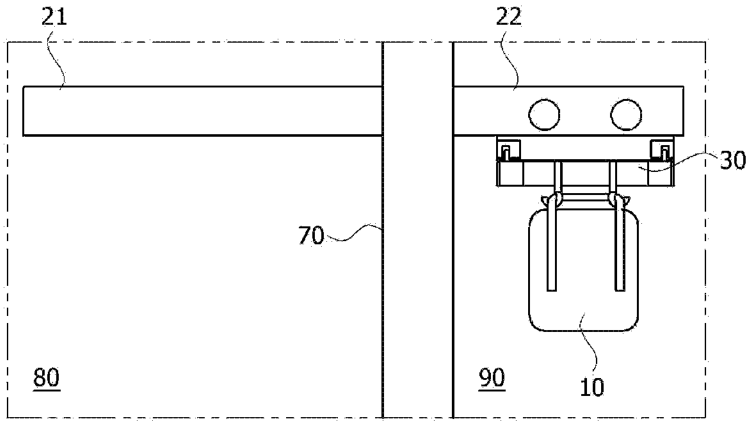
[Figure 15]
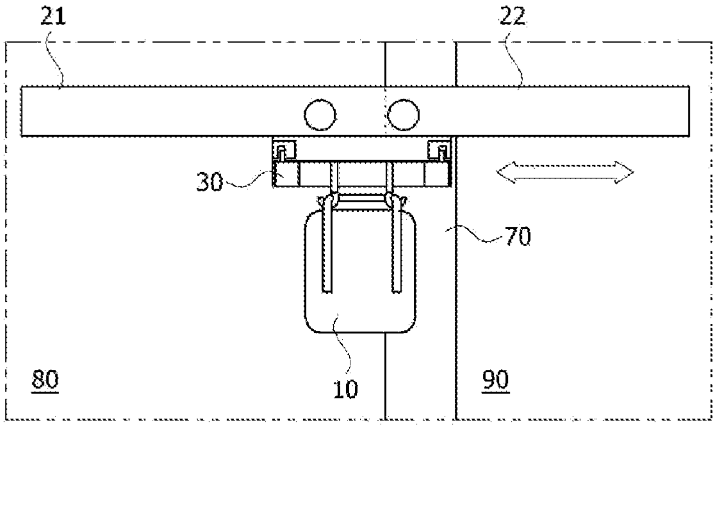

[Figure 16]
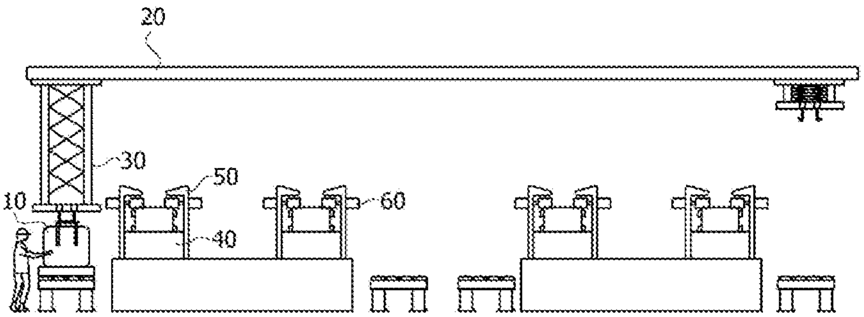
[Figure 17]
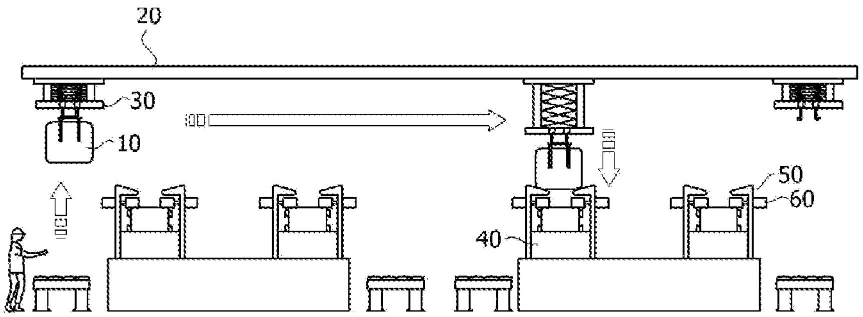
[Figure 18]
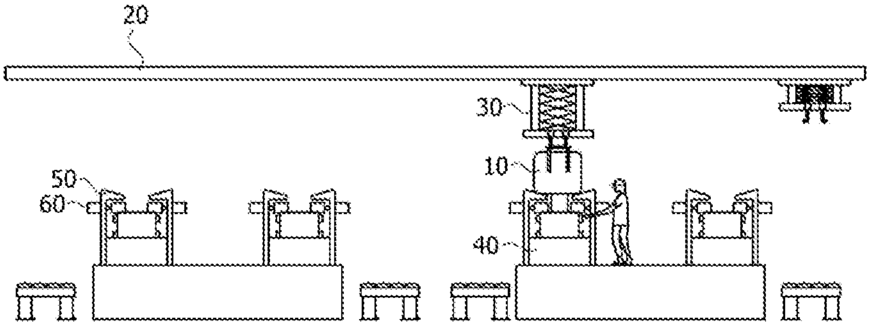
[Figure 19]
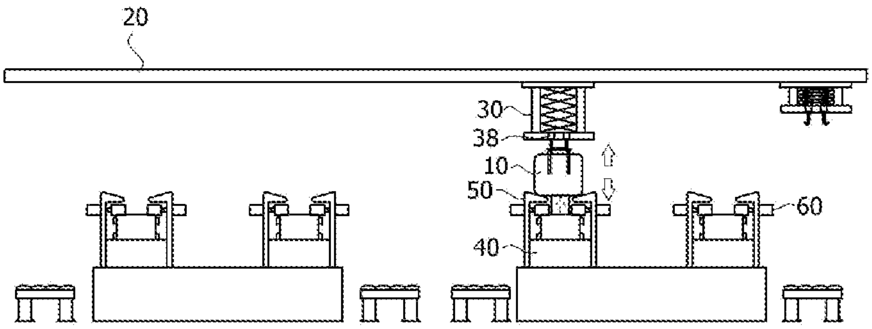

[Figure 20]
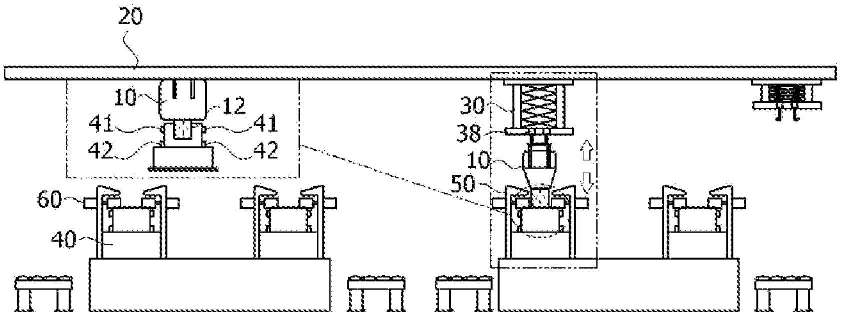
[Figure 21]
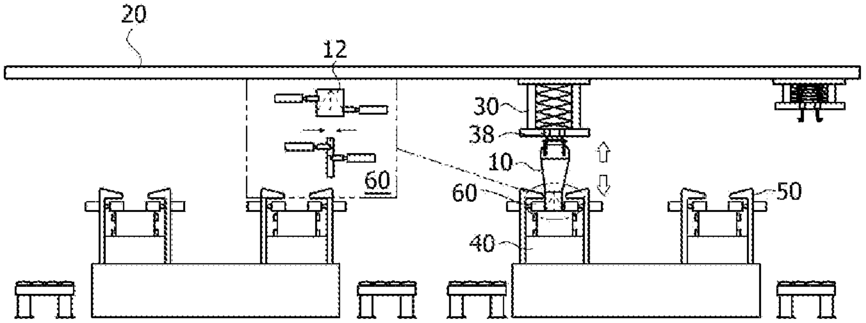
[Figure 22]
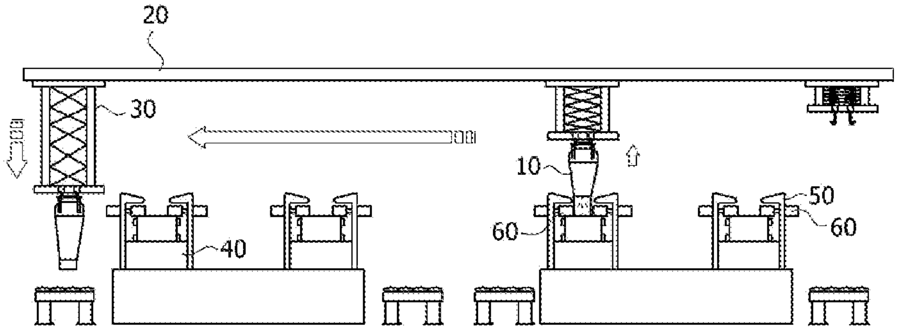
[Figure 23]
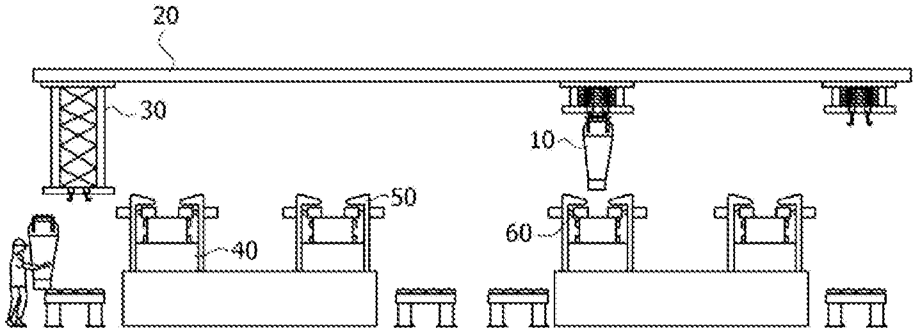

AUTOMATION DEVICE FOR TRANSPORTING AND INPUTTING CONTAINER BAG

CROSS-REFERENCE TO RELATED APPLICATIONS

The present application is a national phase entry under 35 U.S.C. § 371 of International Application No. PCT/KR2023/009723 filed Jul. 10, 2023, published in Korean, which claims priority from 10-2022-0094619 filed Jul. 29, 2022, all of which are incorporated herein by reference.

FIELD OF THE INVENTION

The present invention relates to an automation device for automatic transport and input of a packaging bag.

BACKGROUND OF THE INVENTION

A packaging bag (container bag) is a type of packaging container accommodating raw materials such as battery electrode active materials (active substances). Such a packaging bag may be a flexible container bag that is flexible and deformable, and the flexible container bag is also abbreviated as a flecon bag.

Conventionally, a worker manually introduced active materials to all parts using a manual hoist. Specifically, conventionally, the worker transported packaging bags using a manual hoist, and adjusted the amount of input while visually observing the discharge of the active material, and when the discharge was not smooth due to agglomeration of the active material, the worker continued to perform the discharge while hitting it with a hammer to remove the agglomeration, and when the discharge was completed, the worker tied the end of the discharge part with a string to prevent the remaining amount from falling out.

Therefore, a packaging bag control technology is needed to inject the active material into a hopper, as follows.

1) Packaging bag transport
2) Tilting during packaging bag transport
3) Automatic sensing packaging bag weight and packaging bag height correction according to discharge of active material into hopper (as the active material is discharged from the packaging bag, the length of the packaging bag increases, the height must be raised by the increased length)
4) Upon discharge stop due to agglomeration of the active material in the packaging bag, agglomeration needs to be resolved
5) After completion of packaging bag active material discharge, blocking discharge of insignificant active materials remaining in the outlet (blocks so that the remaining amount does not fall to the floor)

BRIEF SUMMARY OF THE INVENTION

Therefore, it is an object of the present invention to provide an automation device for automatically introducing raw materials such as active materials into a hopper.

In order to achieve the above-described object, the present invention provides an automation device for packaging bag transport and input comprising: a rail disposed above a certain height in a horizontal direction; a hanger mounted on the rail to be capable of reciprocating in the horizontal direction, and enabling to reciprocate a packaging bag mounted at the lower end thereof in a vertical direction; a hopper disposed at the bottom of the rail and into which raw materials inside the packaging bag moved by the hanger are introduced; a hit post disposed near an inlet of the hopper and resolving an agglomeration phenomenon of the raw materials as the packaging bag is hit by the vertical direction reciprocation of the hanger; and grippers blocking the discharge of the raw materials by gripping the bottom of the packaging bag in which the input of the raw materials to the hopper is completed.

In the present invention, the hanger may comprise an upper hanger mounted on the rail, a lower hanger disposed at the bottom of the upper hanger, a wire installed between the upper hanger and the lower hanger, and a hook mounted on the lower hanger to hang the packaging bag.

In the present invention, a location hole may be formed on any one side of the upper hanger and the lower hanger, and a location pin inserted into the location hole may be formed on the other side.

In the present invention, the hook may consist of at least one pair, where the pair of hooks may grip the string-shaped sling bar of the packaging bag at two points, but may have a gap to minimize the height of the packaging bag.

In the present invention, the hanger may further comprise a scissor frame installed between the upper hanger and the lower hanger, and being capable of expansion and contraction in the vertical direction.

In the present invention, the hanger may further comprise load cells installed on both left and right sides of the lower hanger.

In the present invention, it is possible to correct a tilt of the packaging bag by sensing a weight deviation of the load cells on both left and right sides, and it is possible to adjust a height of the packaging bag according to the weight change of the load cells on both left and right sides.

In the present invention, the hopper may comprise upper and lower photo-electric sensors installed near the inlet in the vertical direction to sense the position of the discharge part end of the packaging bag.

In the present invention, the hit post may comprise a support installed on both sides of the hopper, and a hitting plate extending inwardly from the upper end of the support.

In the present invention, the grippers may be installed on both sides near the inlet of the hopper, where each gripper may comprise a rod capable of reciprocating inwardly in the horizontal direction, but have different installation heights, thereby gripping different parts of the packaging bag.

The present invention can provide a packaging bag automation control (OHT) and control (gripper, hit post) technology for introducing active materials into a hopper. In addition, as the active materials are automatically introduced into the hopper, it is possible to reduce the number of workers, and it is possible to reduce the risk of safety accidents caused by handling high load (1 ton) active materials.

BRIEF DESCRIPTION OF THE DRAWINGS

FIG. 1 shows the entire constitution of an automation device for packaging bag transport and input according to the present invention.

FIG. 2 shows the entire constitution of a hanger according to the present invention.

FIG. 3 shows constitutions of a hole and a pin of the hanger according to the present invention.

FIG. 4 shows a floor height lack.

FIG. 5A show a conventional one-point grip, and FIGS. 5B and 5C show a two-point grip according to the present invention.

FIG. 6 shows a case where a packaging bag is tilted.

FIG. 7 shows tilt correction and height adjustment of a packaging bag using a load cell according to the present invention.

FIG. 8 shows active material scattering.

FIG. 9 shows position adjustment of the discharge part end using photo-electric sensors according to the present invention.

FIG. 10 shows active material agglomeration.

FIG. 11 shows agglomeration resolution using a hit post according to the present invention.

FIG. 12 shows a hopper fitting input and finishing work in the form of a manual work.

FIG. 13 shows an active material discharge blocking and finishing work using grippers according to the present invention.

FIG. 14 shows spatial separation of an anterior chamber and a mixer room by a wall.

FIG. 15 shows anterior chamber rail sliding docking after wall opening according to the present invention.

FIGS. 16 to 23 sequentially show hopper input processes of raw materials.

DETAILED DESCRIPTION

Hereinafter, the present invention will be described in detail with reference to the accompanying drawings.

The present invention relates to an automation device for packaging bag transport and input, wherein the packaging bag (10) is a big bag accommodating raw materials, which may be, for example, a flexible container bag (flecon bag) that is flexible and deformable. Referring to FIG. 2, at least one sling bar (11) in the form of a bag strap may be provided at the top of the packaging bag (10) to hang it on a hook (34) of a hanger (30), and an openable and closable raw material discharge part (12) may be provided at the bottom of the packaging bag (10). (FIG. 8) The packaging bag (10) may be composed of an outer packaging material and an inner packaging material. The raw materials are not particularly limited, which may be, for example, mixer process active materials, and the like, and specifically, active materials (active substances) of battery electrodes (negative electrode, and positive electrode), and the like. The raw materials may be accommodated in the packaging bag (10) in the form of powder (pulverulent body) or particles.

Referring to FIG. 1, the automation device for packaging bag transport and input according to the present invention may be composed of a rail (20), a hanger (30), a hopper (40), a hit post (50), grippers (60), and the like.

Referring to FIG. 1, the rail (20) is for moving the hanger (30), which may be disposed above a certain height (for example, 3 to 10 m) in a horizontal direction to implement OHT (overhead hoist transfer). The rail (20) may be fixed or supported through an appropriate fixing or supporting means on the ceiling or floor, and the like. The shape and size of the rail (20), and the like are not particularly limited, which may be set appropriately.

Referring to FIG. 1, the hanger (30) (also called carrier) is for moving the packaging bag (10), which may enable to be mounted on the rail (20), thereby reciprocating in the horizontal direction along the rail (20), and may also enable to reciprocate the packaging bag (10) mounted at the lower end in the vertical direction.

The horizontal reciprocation and vertical reciprocation of the hanger (30) are possible by conventional mechanisms (pulleys and belts, gears and chains, cylinders and pistons, racks and pinions, reels and wires, etc.) which convert rotary motion of a motor into linear motion, and which may be appropriately selected among the foregoing, as needed.

Referring to FIG. 2, the hanger (30) may be composed of an upper hanger (31), a lower hanger (32), a wire (33), a hook (34), a location hole (35), a location pin (36), and a scissor frame (37), a load cell (38), and the like.

Referring to FIG. 2, the upper hanger (31) may be mounted at the bottom of the rail (20), and may be configured in a plate shape (a polygonal plate such as a rectangular plate, a circular plate, an oval plate, etc.). The lower hanger (32) may be disposed at the bottom of the upper hanger (31), and may be configured in the same plate shape as the upper hanger (31).

Referring to FIG. 2, the wire (33) may be installed between the upper hanger (31) and the lower hanger (32) to connect them. The upper end of the wire (33) may be fixed to a roller or reel, and the like installed on the upper hanger (31) or the rail (20), and the like, and the lower end of the wire (33) may be fixed to the lower hanger (32). The wire (33) may be wound and unwound through the roller or reel, and the like, whereby it is possible to reciprocate the lower hanger (32) in the vertical direction.

Referring to FIG. 2, the hook (34) may be mounted on the lower hanger (32) and configured in a ring shape, thereby hanging the packaging bag (10). Referring to FIG. 3, the hook (34) may consist of at least one pair (preferably, two pairs or more), where the one pair of hooks may grip the strap-shaped sling bar (11) of the packaging bag (10) at two points, but may have a gap to minimize the heights of the packaging bag (10) and sling bar (11) (wide double hooks are applied). The hook (34) may be disposed at the lower end of the lower hanger (32), or may be disposed entirely within the height (thickness) range of the lower hanger (32).

Referring to FIG. 4, H1 is the installable height of the rail (20) and the hanger (30), and specifically, when the hook (34) is at the highest height, that is, when the lower hanger (32) rises to come into close contact with the upper hanger (31), the height between the upper end of the rail (20) and the lower end of the hook (34) may be, for example, up to 1.2 m. H2 is the height of the packaging bag (10), and specifically, the height of the packaging bag (10) including the sling bar (11) hung on the hook (34) may be, for example, 1.8 m. H3 is the height of the manual work space, and specifically, the height of the manual work space between the lower end of the packaging bag (10) and the upper end of the hopper (40) may be, for example, 0.5 m. H4 is the height between the lower end of the hook (34) located at the highest height and the upper end of the hopper (40), which may be, for example, up to 2.3 m. In this way, the floor height may be insufficient, so that a solution to the floor height lack is needed.

Referring to FIG. 5, to solve the problem of floor height lack in FIG. 4, it is possible to minimize the height of the packaging bag (10) by maximizing the two-point gripping distance for each sling bar. FIG. 5(*a*) shows a one-point grip of the sling bar (11), and FIGS. 5(*b*) and 5(*c*) show a two-point grip of the sling bar (11), where FIG. 5(*b*) is a front view of the packaging bag (10), and FIG. 5(*c*) is a side view of the packaging bag (10).

In FIG. 5A, H5 is the height between the hook (34) and the upper end of the packaging bag (10) upon the one-point grip, where this height becomes the maximum upon the one-point grip. That is, upon the one-point grip of the sling bar (11), the sling bar (11) hangs loosely on the hook (34) to be added thereto up to the height of the sling bar (11), thereby increasing the height of the packaging bag (10). As seen in FIG. 5B, H6 is the height between the hook (34) and the upper end of the packaging bag (10) upon the two-point grip, where this height may be minimized upon the two-point grip, whereby it can be confirmed that it is much smaller than H5. That is, upon the two-point grip of the sling bar (11), the height of the sling bar (11) decreases and simultaneously the height of the packaging bag (10) decreases. D1 is the gripping distance upon the two-point grip, which is the distance (interval) between the pair of hooks (34), and by maximizing this gripping distance (D1), it is possible to minimize the height of the packaging bag (10), and in this case, the upper end of the packaging bag (10) may be made in close contact with or almost in close contact with the hook (34).

In addition, it is possible to solve the floor height lack by compacting the running rail (20) and the hanger (30). Specifically, upon docking of the upper hanger (31) and the lower hanger (32), the hook (34) is positioned at the highest height, where it is preferable that the height between the upper end of the rail (20) and the lower end of the hook (34) is designed to be up to 1.2 m.

Referring to FIG. 3, a location hole (35) may be formed on any one side of the upper hanger (31) and the lower hanger (32), and a location pin (36) inserted into the location hole (35) may be formed on the other side. In FIG. 3, the location hole (35) is formed in the upper hanger (31), and the location pin (36) is formed in the lower hanger (32), but the opposite case is also possible. The location hole (35) may be formed in the form of a groove or hole on the lower surface of the upper hanger (31), and the location pin (36) may be formed in the form of a protrusion on the upper surface of the lower hanger (32).

Referring to FIG. 3, at least one pair of location holes (35) may be formed on both sides of the upper hanger (31), and similarly, at least one pair of location pins (36) may be formed on both sides of the lower hanger (32). The location hole (35) and the location pin (36) may have shapes and sizes that correspond to each other. While the packaging bag (10) moves upward along the lower hanger (32) and the hook (34), and the upper hanger (31) and lower hanger (32) come into close contact with each other, the location hole (35) and the location pin (36) may be docked.

Upon left and right movement of the packaging bag (10), there may be a problem that the packaging bag (10) shakes in left and right directions, but through the docking of the location hole (35) and the location pin (36), and the two-point grip of the sling bar (11), it is possible to solve or minimize the problem of left and right shaking of the packaging bag (10) when the packaging bag (10) is moved left and right.

Referring to FIG. 2, the scissor frame (37) is installed between the upper hanger (31) and the lower hanger (32), and is capable of expansion and contraction (deformation) in the vertical (height) direction. The upper end of the scissor frame (37) may be fixed to the upper hanger (31), and the lower end of the scissor frame (37) may be fixed to the lower hanger (32). When the packaging bag (10) is lowered, the height of the scissor frame (37) may increase, and when the packaging bag (10) is raised, the height of the scissor frame (37) may decrease. The scissor frame (37) may simply be passively elongated and contracted by active movement of the wire (33).

Even upon up and down movement of the packaging bag (10), there may be a problem that the packaging bag (10) shakes in the left and right directions, but by applying the scissor frame (37) between the upper hanger (31) and the lower hanger (32), it is possible to solve or minimize the problem of left and right shaking of the packaging bag (10) when the bag (10) is moved up and down.

Referring to FIG. 6, the packaging bag (10) may be tilted to one side when the active material is introduced. In addition, the length of the packaging bag (10) may increase when the active material is introduced.

Referring to FIG. 7, to solve the problems of tilt and length increase of the packaging bag (10) in FIG. 6, load cells (38) may be installed on both left and right sides of the lower hanger (32). At least one pair of load cells (38) may be formed on both sides of the lower hanger (32), and measure weights in real time. By sensing the weight deviation of the load cells (38) on both left and right sides, it is possible to correct the tilt of the packaging bag (10), and it is possible to adjust the height of the packaging bag (10) according to the weight change of the load cells (38) on both left and right sides.

When the packaging bag (10) is tilted downward to the right as in the left drawing of FIG. 7, the load cells (38) sense the weight deviation to adjust the displacement of the right wire (33), whereby it is possible to align it by correcting the tilt of the packaging bag (10). In addition, when the length of the packaging bag (10) increases as in the right drawing of FIG. 7, the load cells (38) sense the weight change, and the wire (33) rises, whereby it can be corrected by offsetting the length increase of the packaging bag (10).

Referring to FIG. 8, the hopper (40) is disposed at the bottom of the rail (20), and is a place where raw materials inside the packaging bag (10) moved by the hanger (30) are input, and when the height of the packaging bag (10) is adjusted, the discharge part (12) of the packaging bag (10) may be separated from the hopper (40), and accordingly, there may be a problem that the active material scatters. Therefore, when the height of the packaging bag (10) is adjusted, it is necessary to maintain the entry depth of the discharge part (12) of the packaging bag (10) into the hopper (40).

Referring to FIG. 9, to solve the active material scattering problem of FIG. 8, an upper photo-electric sensor (41) and a lower photo-electric sensor (42) may be installed vertically near the inlet of the hopper (40) to sense the position of the end of the discharge part (12) of the packaging bag (10). At least one pair of the upper photo-electric sensors (41) may be mounted on both sides of the upper part of the hopper (40), and sense the minimum (Min.) position of the end of the discharge part (12) of the packaging bag (10). At least one pair of the lower photo-electric sensors (42) may be mounted on both sides of the bottom of the inlet of the hopper (40), and sense the maximum (Max.) position of the end of the discharge part (12) of the packaging bag (10). By reflecting the sensing results of both photo-electric sensors (41, 42), it is possible to lower the packaging bag (10) when the minimum (Min.) position is sensed, and it is possible to raise the packaging bag (10) when the maximum (Max.) position is sensed.

Referring to FIG. 10, the active material agglomeration may occur near the discharge part (12) of the packaging bag (10) to stop the discharge.

Referring to FIG. 11, to solve the active material agglomeration problem of FIG. 10, the hit post (50) may be disposed near the inlet of the hopper (40). The hit post (50) may be in a fixed type, and may be composed of a support (51) installed on both sides of the hopper (40), and a hitting plate (52) extending inwardly from the upper end of the support (51). The packaging bag (10) may be hit to the hitting plate (52) of the hit post (50) by the vertical direction reciprocation of the hanger (30) to resolve the agglomeration phenomenon of the active material.

Specifically, if there is no weight change of the load cell (38), it is regarded that the agglomeration phenomenon of the active material has occurred, and as the packaging bag (10) is repeatedly lowered and raised to collide the packaging bag (10) with the hitting plate (52) of the fixed hit post (50), it is possible to resolve the active material agglomeration. The load cell (38) may sense the moment when the packaging bag (10) is hit (collided) to the hit post (50).

Referring to FIG. 12, conventionally, the hopper fitting input and finishing work was performed manually. Specifically, after confirming the input weight, a worker finished by grabbing the discharge part (12) of the packaging bag (10). That is, conventionally, after completing the raw material input, the input of a worker was required for a packaging material finishing work inside the packaging bag (10).

Referring to FIG. 13, to solve the manual work problem of FIG. 12, the grippers (61, 62) may grip (finish) the discharge part (12) of the empty packaging bag (10) in which the raw material input into the hopper (40) is completed to block the discharge of raw materials. The grippers (61, 62) may be installed on both sides near the inlet of the hopper (40), where each gripper (61, 62) may comprise a rod (63, 64) capable of reciprocating inwardly in the horizontal direction, but have different installation heights, thereby gripping different parts of the packaging bag (10).

Referring to FIG. 13, the upper gripper (61) and the lower gripper (62) may be disposed at the bottom of the hitting plate (52) of the hit post (50), and may be fixed to both supports (51), respectively. The upper gripper (61) and the lower gripper (62) may be disposed to face each other on opposite sides, and the upper rod (63) and the lower rod (64) move inwardly toward the center, so that they may be almost close to the center. By finishing the discharge part (12) to be crushed and deformed by pressurization of both grippers (61, 62), the remaining raw materials can be prevented from falling to the floor. As shown, for effective finishing (sealing) of the discharge part (12), the lower end of the upper gripper (61) and the upper end of the lower gripper (62) may be disposed to be positioned at the same height. In this way, when the packaging bag (10) reaches a certain weight, the discharge of the active material can be blocked and finished using the grippers (60).

Referring to FIG. 14, a work space may be separated into a mixer room (80) and an anterior chamber (90) by a wall (70), but conventionally, separate rails (21, 22) were installed in the mixer room (80) and the anterior chamber (90), respectively, and the two spaces were operated individually.

Referring to FIG. 15, to solve the separation problem of FIG. 14, a door may be installed on the wall (70), and after opening the door, the rail (22) of the anterior chamber (90) may be slid in the horizontal direction (arrow) to be docked with the rail (21) of the mixer room (80), and accordingly, the packaging bag (10) and the hanger (30) may freely move between the mixer room (80) and the anterior chamber (90).

Hereinafter, with reference to FIGS. 16 to 23, the hopper input processes of raw materials will be sequentially described. Only one rail (20) may be installed, and a plurality of hangers (30), hoppers (40), hit posts (50), grippers (60), and the like may be installed. The packaging bag (10) may be mounted on a stand.

Referring to FIG. 16, the hanger (30) is lowered, the worker fixes the packaging bag (10) to the hanger (30), and presses a work completion button after fixing (manual process).

Referring to FIG. 17, the hanger (30) is raised by the OHT, the packaging bag (10) is transported to the designated hopper (40) position along the rail (20), and then the hanger (30) is lowered (automatic process).

Referring to FIG. 18, the worker dismantles the bottom of the packaging bag (10), connects it to the inside of the hopper (40), and then presses the work completion button (manual process).

Referring to FIG. 19, the internal material of the packaging bag (10) is introduced into the hopper (40) by the OHT and simultaneously the weight is measured in real time with the load cell (38), and when the internal material of the packaging bag (10) agglomerates without any weight change, the packaging bag (10) is moved up/down and simultaneously collides with the hit post (50) to resolve the agglomeration (automatic process).

Referring to FIG. 20, the weight of the packaging bag (10) is measured in real time on the hanger (30) by the OHT using the load cell (38), and as the length of the packaging bag (10) is increased according to the discharge of the internal material of the packaging bag (10), the entire height of the packaging bag (10) is corrected, and simultaneously the internal material is introduced into the hopper (40) (automatic process). Upon adjusting the entire height of the packaging bag (10), the position of the end of the discharge part (12) is sensed using photo-electric sensors (41, 42) so that the end of the discharge part (12) does not fall out of the hopper (40).

Referring to FIG. 21, when the material input is completed by the OHT and the sensed weight of the load cell (38) becomes 0, the discharge part (12) of the packaging bag (10) is bent with the gripper (60), so that the finely remaining material does not come out of the discharge part (12) (automatic process).

Referring to FIG. 22, the hanger (30) is raised by the OHT, and the empty packaging bag (10) in which the input is completed is transported to the recovery position along the rail (20), and then the hanger (30) is lowered (automatic process).

Referring to FIG. 23, the worker detaches and discards the empty packaging bag (10) transported to the recovery location (manual process).

In short, the work sequence is as follows. Hanger (carrier) (30) lowering→packaging bag (10) transfer and hanger (30) raising→packaging bag (10) transport to hopper (40) (horizontal movement along rail (20))→load cell (38) weight deviation sensing and packaging bag (10) alignment (correction for tilt, etc.)→packaging bag (10) lowering and active material input to hopper (40)→agglomeration resolution by hitting bottom of packaging bag (10) to hit post (50)→set weight input and then discharge blocking with gripper (60) (fitting input)→empty packaging bag (10) raising and recovery position movement.

As described above, in the present invention, the packaging bag (10) can be automatically controlled and the active material can be introduced by applying the OHT. Specifically, in the present invention, the rail (20) can automatically transport the packaging bag (10) mounted on the hanger (30) by applying the OHT disposed above a certain height; when the change of the discharged weight due to agglomeration of the active material is insignificant by measuring the transport weight in real time with the load cell (38) applied to the hanger (30), the agglomeration can be resolved by moving the packaging bag (10) up and down to collide with the hit post (50); and if the discharge into the hopper (40) is completed, the remaining amount can be kept from falling to the floor by crushing and deforming the discharge part (12) using the grippers (60) so that the slight remaining amount does not fall to the floor.

EXPLANATION OF REFERENCE NUMERALS

10: packaging bag, 11: sling bar, 12: discharge part, 20, 21, 22: rail, 30: hanger, 31: upper hanger, 32: lower hanger, 33: wire, 34: hook, 35: location hole, 36: location pin, 37: scissor frame, 38: load cell, 40: hopper, 41: upper photo-electric sensor, 42: lower photo-electric sensor, 50: hit post, 51: support, 52: hitting plate, 60: gripper, 61: upper gripper, 62: lower gripper, 63: upper rod, 64: lower rod, 70: wall, 80: mixer room, 90: anterior chamber

The invention claimed is:

1. An automation device for packaging bag transport and input, comprising:

a rail disposed above a certain height in a horizontal direction;

a hanger mounted on the rail configured for reciprocating in the horizontal direction, and enabling to reciprocate a packaging bag mounted at a lower end thereof in a vertical direction;

a hopper disposed at a bottom of the rail and into which raw materials inside the packaging bag moved by the hanger are configured to be introduced;

a hit post disposed near an inlet of the hopper and resolving an agglomeration phenomenon of the raw materials as the packaging bag is configured to be hit by the vertical direction reciprocation of the hanger; and grippers configured for blocking a discharge of the raw materials by gripping a bottom of the packaging bag from which an input of the raw materials to the hopper is completed, wherein the grippers are installed on both sides near the inlet of the hopper, where each gripper comprises a rod configured for reciprocating inwardly in the horizontal direction, but having different installation heights, thereby configured for gripping different parts of the packaging bag.

2. The automation device for packaging bag transport and input according to claim 1, wherein the hanger comprises an upper hanger mounted on the rail, a lower hanger disposed at a bottom of the upper hanger, a wire installed between the upper hanger and the lower hanger, and a hook mounted on the lower hanger to hang the packaging bag.

3. The automation device for packaging bag transport and input according to claim 2, wherein a location hole is formed on any one side of the upper hanger and the lower hanger, and a location pin inserted into the location hole is formed on another side.

4. The automation device for packaging bag transport and input according to claim 2, wherein the hook comprises at least one pair of hooks, where the at least one pair of hooks is configured to grip a string-shaped sling bar of the packaging bag at two points, but has a gap to minimize a height of the packaging bag.

5. The automation device for packaging bag transport and input according to claim 2, wherein the hanger further comprises a scissor frame installed between the upper hanger and the lower hanger, and configured for expansion and contraction in the vertical direction.

6. The automation device for packaging bag transport and input according to claim 2, wherein the hanger further comprises load cells installed on both left and right sides of the lower hanger.

7. The automation device for packaging bag transport and input according to claim 6, wherein the device is configured to correct a tilt of the packaging bag by sensing a weight deviation of the load cells on both left and right sides, and to adjust a height of the packaging bag according to the weight deviation of the load cells on both left and right sides.

8. The automation device for packaging bag transport and input according to claim 1, wherein the hopper comprises upper and lower photo-electric sensors installed near the inlet in the vertical direction to sense a position of a discharge part end of the packaging bag.

9. The automation device for packaging bag transport and input according to claim 1, wherein the hit post comprises a support installed on both sides of the hopper, and a hitting plate extending inwardly from an upper end of the support.

* * * * *